United States Patent
Krämer

(10) Patent No.: US 8,376,440 B2
(45) Date of Patent: Feb. 19, 2013

(54) SEAT DEVICE

(75) Inventor: Marco Krämer, Wolpertshausen (DE)

(73) Assignee: RECARO Aircraft Seating GmbH & Co., KG, Schwäbisch Hall (DE)

( * ) Notice: Subject to any disclaimer, the term of this patent is extended or adjusted under 35 U.S.C. 154(b) by 862 days.

(21) Appl. No.: 12/225,190

(22) PCT Filed: Jan. 17, 2007

(86) PCT No.: PCT/EP2007/000353
§ 371 (c)(1),
(2), (4) Date: Aug. 11, 2009

(87) PCT Pub. No.: WO2007/107194
PCT Pub. Date: Sep. 27, 2007

(65) Prior Publication Data
US 2009/0319086 A1  Dec. 24, 2009

(30) Foreign Application Priority Data
Mar. 18, 2006 (DE) .......................... 10 2006 012 602

(51) Int. Cl.
*B64D 11/06* (2006.01)
*B60N 2/02* (2006.01)

(52) U.S. Cl. ............... 296/65.01; 296/64; 244/118.6; 700/302; 318/548

(58) Field of Classification Search ............ 700/275, 700/302; 297/217.3; 244/118.6; 318/547, 318/548; 296/65.01, 65.07, 65.12
See application file for complete search history.

(56) References Cited

U.S. PATENT DOCUMENTS

| | | | |
|---|---|---|---|
| 4,707,788 A | 11/1987 | Tashiro et al. | |
| 5,285,139 A | 2/1994 | Ogasawara | |
| 2002/0113478 A1 | 8/2002 | Kasahara | |
| 2002/0185985 A1 | 12/2002 | Fraser | |
| 2008/0121757 A1* | 5/2008 | Pozzi et al. | 244/118.6 |
| 2010/0176632 A1* | 7/2010 | Alford et al. | 297/217.3 |
| 2011/0112449 A1* | 5/2011 | Hopf et al. | 601/91 |
| 2012/0023526 A1* | 1/2012 | Petitpierre | 725/76 |

FOREIGN PATENT DOCUMENTS

| | | |
|---|---|---|
| DE | 36 09 690 A1 | 9/1986 |
| DE | 44 03 073 A1 | 8/1994 |
| DE | 195 22 897 A1 | 1/1997 |
| DE | 195 22 897 C2 | 1/1997 |
| DE | 198 11 959 A1 | 9/1999 |
| FR | 2 736 879 A1 | 1/1997 |

(Continued)

OTHER PUBLICATIONS

PCT International Search Report mailed on Jun. 29, 2007 for the corresponding International patent application No. PCT/EP2007/000353 (English translation enclosed).

(Continued)

*Primary Examiner* — Eduardo Colon
(74) *Attorney, Agent, or Firm* — Posz Law Group, PLC

(57) ABSTRACT

An airplane seat includes a processing unit, adapted to operate actuators, and a memory unit in which at least one comfort position transition dataset for bringing about a comfort position transition between at least two comfort positions is memorized. The processing unit, in at least one operating mode, is adapted to operate the actuators in accordance with the comfort position transition dataset for bringing about the comfort position transition.

16 Claims, 1 Drawing Sheet

FOREIGN PATENT DOCUMENTS

| | | |
|---|---|---|
| FR | 2 838 887 A1 | 10/2003 |
| FR | 2 859 175 A1 | 3/2005 |
| WO | WO 96/41557 | 12/1996 |
| WO | WO 01/40013 A1 | 6/2001 |
| WO | WO 02/066325 A1 | 8/2002 |

OTHER PUBLICATIONS

German Search Report mailed on Jul. 20, 2006 for the corresponding German priority application No. DE 10 2006 012 602.5 (copy of German language report enclosed).

* cited by examiner

SEAT DEVICE

CROSS REFERENCE TO RELATED APPLICATIONS

This application is a U.S. national stage application of PCT/EP2007/000353 filed on Jan. 17, 2007, and claims priority to, and incorporates by reference, German Patent Application No. 10 2006 012 602.5 filed on Mar. 18, 2006.

BACKGROUND

The invention relates generally to seat devices, and particularly to an aircraft seat device.

A seat device which allows seat components to be moved within a so-called envelope curve is known. The seat device comprises a monitoring device which drives the seat components in such a manner that, on the one hand, a movement sequence situation which is obvious to a seat user is achieved for all seat components and, on the other hand, collision protection is nevertheless simultaneously ensured for all components.

SUMMARY

The invention proposes a seat device, in particular an aircraft seat device, having a processing unit, which is provided for the purpose of operating actuators, and having a memory unit in which at least one data record concerning a comfort position transition for achieving a comfort position transition between at least two comfort positions is stored, wherein the processing unit is provided, in at least one operating mode, for the purpose of operating the actuators according to the data record concerning the comfort position transition in order to achieve the comfort position transition. In this case, a "comfort position" should be understood as meaning, in particular, a definitely predetermined position such as, in particular in the case of an aircraft seat device, one or more landing and starting positions, one or more resting or relaxation positions, one or more eating positions, one or more working positions etc. A "comfort position transition" should be understood as meaning, in particular, a definitely predetermined transition between two comfort positions, with the result that, in particular, seat component points or points on seat components follow definitely predetermined space curves during the transition between two comfort positions, wherein the space curves preferably result from at least partially simultaneous operation of actuators. A "processing unit" should be understood as meaning, in particular, a control and/or regulating unit having one or more processors and preferably one or more memory units, the processing unit also being able to comprise a plurality of decentralized subunits, for example processing units which are arranged in a decentralized manner. Furthermore, "provided" should be understood as meaning, in particular, specially equipped, designed and/or programmed.

A corresponding configuration according to the invention makes it possible, with a small amount of computation and power, to achieve a safe, comfort and collision-free movement sequence of seat components in order to achieve a transition between two comfort positions. Power-intensive processing units can be avoided and the power requirement can be reduced, in particular in the case of aircraft seats devices.

If in the memory unit at least two data records concerning the comfort position transition for at least two comfort positions are stored, a plurality of corresponding movement sequences, in particular between more than two comfort positions, can be advantageously achieved. In principle, however, it is also conceivable for two data records concerning the comfort position transition to be associated with a transition between two comfort positions and/or else for one data record concerning the comfort position transition to be associated with a plurality of transitions.

As an alternative or, in particular, in addition to data for achieving definitely predetermined space curves, the data record concerning the comfort position transition preferably has data relating to at least one adjustment speed, thus making it possible to achieve a high degree of flexibility and, in particular, a high degree of comfort, to be precise, in particular when the processing unit is provided for the purpose of operating at least one actuator on the basis of the data relating to the at least one adjustment speed in such a manner that a decreasing adjustment speed is established in a range before a comfort position, with the result that a harmonious transition can be achieved.

Another configuration of the invention proposes that the memory unit has data for driving at least one upholstery extension unit, and the processing unit is provided for the purpose of operating the upholstery extension unit. In this case, an upholstery extension unit should be understood as meaning, in particular, a unit which is provided for the purpose of increasing and/or reducing an extent of an upholstery unit in at least one direction. The upholstery extension unit is preferably formed, in particular at least partially, by a pump unit which can be used to pump air into or out of an upholstery unit. A corresponding configuration according to the invention makes it possible to advantageously superimpose an adjusting movement of an actuator and of the upholstery extension unit and to further enhance comfort.

In order to make it possible, in particular, for an end user, such as an aircraft passenger, to make an individual adaptation, the processing unit is provided for the purpose of storing at least one comfort position in the memory unit, and/or the memory unit stores at least one data record which defines a range in which individual adaptations are allowed, based on a comfort position and/or a position on a space curve, and/or the seat device has a means for deactivating the operating mode for operation on the basis of at least one data record concerning the comfort position transition. If an individual adaptation has been made by an end user within a predefined range and if a transition to a further comfort position is then intended to be carried out, the individual adaptation is preferably automatically restored first of all, with the result that the transition to the comfort position sought can be achieved again with a small amount of computation and without the risk of a collision. If the operating mode is deactivated, a further operating mode is preferably activated, for example an operating mode in which free adjustment within a so-called envelope curve is possible.

It is also proposed that the processing unit is provided for the purpose of adapting at least one comfort position transition in at least partially automated fashion on the basis of at least one parameter. If the parameter is used to detect a particular situation, such as, in particular, an emergency, the transition can be adapted to the situation in at least partially automated fashion, and preferably in fully automated fashion, and the transition can be carried out in a faster, slower and/or else more energy-saving manner than a particularly comfort transition. In this case, appropriate data are preferably stored in the memory unit.

If the seat device has a collision monitoring unit, collisions can be avoided in a particularly reliable manner, in particular whenever the operating mode for operation on the basis of at least one data record concerning the comfort position transition fails or is deactivated. In this case, all collision monitoring units which appear to be expedient to a person skilled in the art are conceivable in principle. However, the collision monitoring unit advantageously has a memory unit with data which are stored therein and describe at least one limit curve, and the collision monitoring unit is designed in a particularly advantageous manner in accordance with the collision monitoring unit described in the document WO 02/066325 A1. In this respect, reference is made to the entire description of the document WO 02/066325 A1 which should be expressly regarded as belonging to the disclosure.

The solution according to the invention is suitable, in principle, for all seat devices which appear to be appropriate to a person skilled in the art but is particularly advantageously suitable for aircraft seat devices which often have particularly numerous comfort positions and have to be adjusted in confined spaces and by operating particularly numerous actuators.

BRIEF DESCRIPTION OF THE DRAWINGS

Further advantages emerge from the following description of the drawing. The drawing illustrates one exemplary embodiment of the invention. The drawing, description and claims contain numerous features in combination. A person skilled in the art will also expediently consider the features individually and will combine them to form expedient further combinations.

In the drawings.

DETAILED DESCRIPTION

Figure 1:
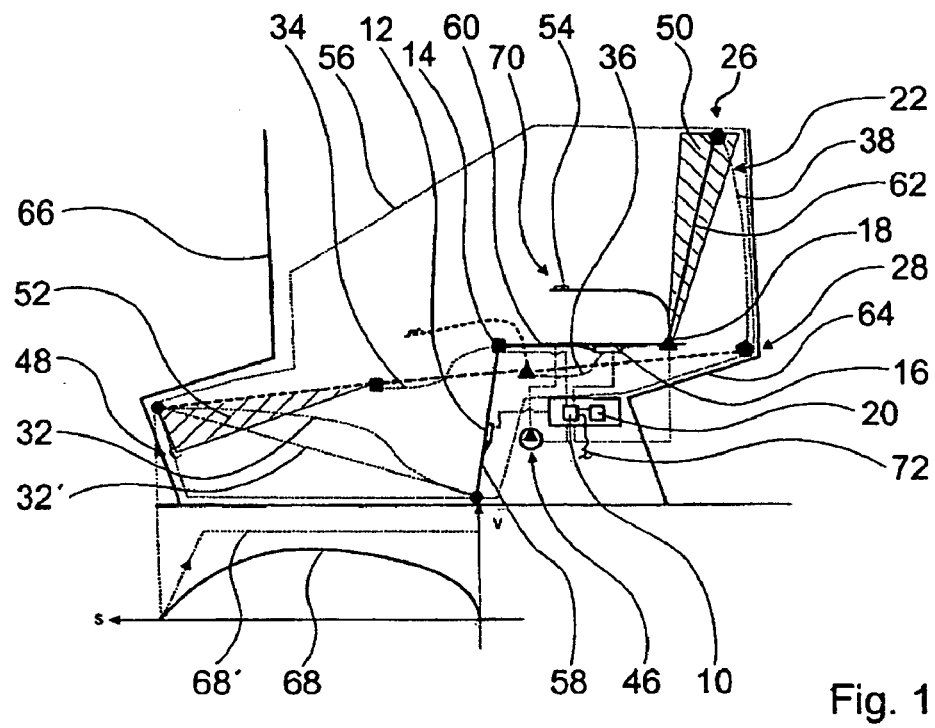
FIG. 1 shows a diagrammatically illustrated aircraft seating area in the case of a first comfort position transition between two comfort positions with an aircraft seat device according to the invention.
Figure 2:
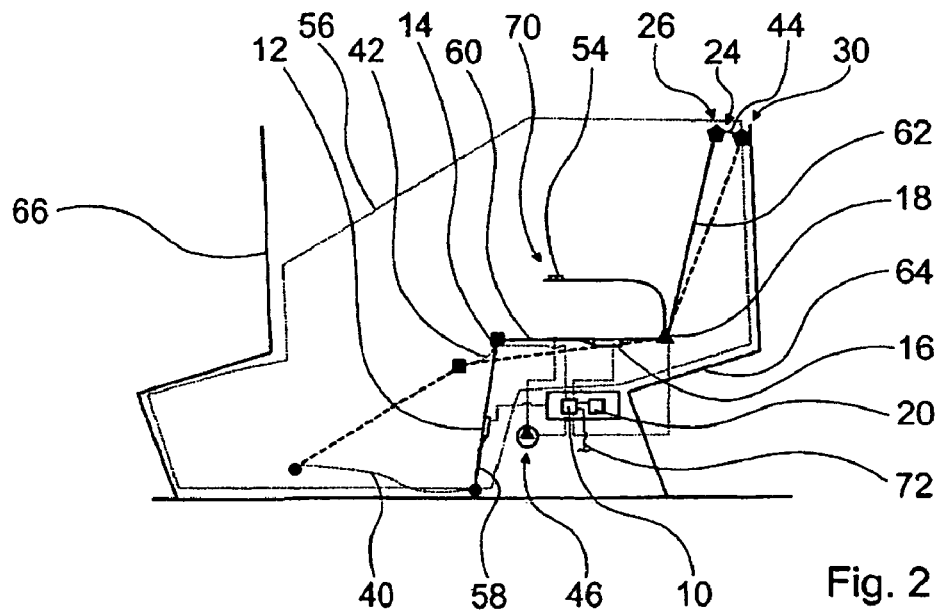
FIG. 2 shows the aircraft seating area in the case of a second comfort position transition between two comfort positions.

FIG. 1 shows a diagrammatically illustrated aircraft seating area in the case of a first comfort position transition 22 between a first comfort position 26, which is formed by a starting/landing position, and a second comfort position 28 which is formed by a bed position. FIG. 2 illustrates the aircraft seating area in the case of a second comfort position transition 24 between the first comfort position 26 and a further comfort position 30 which is formed by a resting position. In addition to the comfort positions 26, 28, 30 which are illustrated only by way of example, numerous further comfort positions and comfort position transitions are also conceivable.

The aircraft seating area is arranged, in the longitudinal direction of an aircraft, between a rear housing 64, which is associated with said seating area, and a rear housing 66 which is associated with a seating area in front (not illustrated in any more detail).

The aircraft seating area has an aircraft seat device according to the invention having a processing unit 10 which is formed by a control and regulating unit and is provided for the purpose of operating actuators 12, 14, 16, 18. The actuator 12 is provided for the purpose of retracting and extending or for lengthening and shortening a seat component 58 which is formed by a leg rest, the actuator 14 is provided for the purpose of pivoting the seat component 58, the actuator 16 is provided for the purpose of adjusting the depth of a seat component 60 formed by a seat base, and the actuator 18 is provided for the purpose of pivoting a seat component 62 formed by a backrest.

The aircraft seat device also has an electronic memory unit 20 which stores data records concerning a comfort position transition for achieving the comfort position transitions 22, 24 between the comfort positions 26, 28, 30, the processing unit 10 being coupled to the memory unit 20 and to the actuators 12, 14, 16, 18 and being provided, in an operating mode, for the purpose of operating or driving the actuators 12, 14, 16, 18 according to the data records concerning the comfort position transition in order to achieve the comfort position transitions 22, 24.

The data records concerning the comfort position transition have data for achieving predetermined space curves 32-44. During the comfort position transitions 22, 24, the actuators 12, 14, 16, 18 are, in principle, driven at the same time, with the result that the seat components 58, 60, 62 respectively move, with their respective end points, on one of the space curves 32-44 sketched. In this case, the same space curves 32-44 are described irrespective of the direction of a transition. In principle, however, it would also be conceivable for at least partially different space curves to be described for a transition in one direction and a transition in an opposite direction. In addition, at least partially sequential operation of the actuators 12, 14, 16, 18 would also be conceivable in principle.

The data record concerning the comfort position transition also comprises data relating to adjustment speeds v. FIG. 1 illustrates a graph of the adjustment speed v of an end point of the seat component 58 against travel s on the space curve 32. It can be seen in this case that, during the comfort position transition 22 from the comfort position 26 to the comfort position 28, the processing unit 10 operates the actuators 12, 14 in such a manner that that end point of the seat component 58 which is remote from the seat component 60 is first of all moved at an increasing adjustment speed v and, before reaching an end position associated with the comfort position 28, is moved at a decreasing adjustment speed v according to a function 68.

The memory unit 20 also has data for driving an upholstery extension unit 46 which comprises an air pump, the processing unit 10 being coupled to the upholstery extension unit 46 and being provided for the purpose of operating the upholstery extension unit 46; to be precise, the upholstery extension unit 46 is driven at the same time as the actuators 12, 14, 16, 18 in order to achieve a transition between an upholstery volume, which is associated with the comfort position 26, and an upholstery volume which is associated with the comfort position 28.

The memory unit 20 also stores data records which define ranges 50, 52 in which, prompted by an end user, such as, in particular, an aircraft passenger, individual adaptations are allowed. For example, the seat component 58 can be pivoted further downward within the range 52, starting from the comfort position 28, and the seat component 62 can be pivoted forward and backward within the range 50, starting from the comfort position 26, using an operating unit 70. The processing unit 10 is provided for the purpose of storing comfort positions 48 in the memory unit 20, with the result that, following an individual adjustment by an end user using the operating unit 70, the individually adjusted position can be stored as a comfort position 48, as indicated in FIG. 1. During a comfort position transition 22, 24, an end user can stop the adjustment operation at any time and the intermediate position reached can also be stored as an individual comfort position.

The aircraft seat device also has a collision monitoring unit which is essentially formed by the processing unit 10 and the memory unit 20, the memory unit 20 storing data which describe a limit curve 56 which forms an envelope curve. The seat components 58, 60, 62 cannot be moved out of the limit curve 56 with any part or can only be moved within the limit curve 56. The collision monitoring unit is always active, with the result that, even in the case of a defective space curve 32-44, it is always ensured that a collision is avoided during a comfort position transition 22, 24.

The operating unit 70 also has a means 54 which is provided for the purpose of the activating the operating mode for operation on the basis of the data records concerning the comfort position transition. If the operating mode on the basis of the data records concerning the comfort position transition is deactivated, an operating mode in which an individual adjustment is possible within the limit curve 56 is automatically activated or an operating mode which corresponds to an operating mode described in WO 02/066325 A1 is activated, in which case reference may be made to the description of WO 02/066325 A1.

The processing unit 10 is also provided for the purpose of automatically adapting the comfort position transition 22 on the basis of a parameter which can be supplied to the processing unit 10 by means of a data line 72. Appropriate data are stored in the memory unit 20 for this purpose. If a parameter which is associated with an emergency in which the fastest possible comfort position transition should be carried out is transmitted to the processing unit 10 in the comfort position 28, higher adjustment speeds v are set using the processing unit 10. The graph in FIG. 1 illustrates an adjustment speed v of that end point of the seat component 58 which is remote from the seat component 60 against travel s on an adapted space curve 32'. It can be seen in this case that, during the adapted comfort position transition 22 from the comfort position 28 to the comfort position 26, the processing unit 10 operates the actuators 12, 14 in such a manner that that end point of the seat component 58 which is remote from the seat component 60 is always moved at maximum speed following a starting phase in accordance with a function 68'.

The invention claimed is:

1. A seat device, comprising;
   seat components that are adjustable,
   at least one actuator for adjusting positions of the seat components,
   a memory unit storing at least one data record concerning a comfort position transition for achieving a comfort position transition between at least two definitely predetermined comfort positions obtained by adjusting positions of the seat components, the memory unit also storing at least another data record which defines a range of individual adaptations of positions for the seat components by an end user,
   a processing unit operating the at least one actuator according to the at least one data record concerning the comfort position transition in order to achieve the comfort position transition and according to the at least another data record within the range of individual adaptations of positions for the seat components.

2. The seat device as claimed in claim 1,
   wherein the memory unit stores at least two data records for at least two comfort position transitions.

3. The seat device as claimed in claim 1,
   wherein the data record concerning the comfort position transition has data for achieving predetermined space curves, wherein during the comfort position transition seat components are actuated by the actuators and points of the seat components follow the definitely predetermined space curves.

4. The seat device as claimed in claim 1,
   wherein the data record concerning the comfort position transition comprises data relating to at least one adjustment speed.

5. The seat device as claimed in claim 4,
   wherein the processing unit is provided for the purpose of operating the at least one actuator on the basis of the data relating to the at least one adjustment speed in such a manner that a decreasing adjustment speed is established in a range before a comfort position is reached.

6. The seat device as claimed in claim 1,
   wherein the memory contains data for driving at least one upholstery extension unit, and the processing unit operates the upholstery extension unit.

7. The seat device as claimed in claim 1,
   wherein the processing unit stores at least one comfort position in the memory unit by an end user.

8. The seat device as claimed in claim 1, further comprising a means for deactivating the operating mode for operation of the actuators on the basis of at least one data record concerning the comfort position transition,
   wherein, when the operating mode is deactivated, a further operating mode for operation of the actuators can be activated.

9. The seat device as claimed in claim 1, wherein the processing unit adapts at least one comfort position transition in at least partially automated fashion on the basis of at least one parameter.

10. The seat device as claimed in claim 1, further comprising a collision monitoring unit.

11. The seat device as claimed in claim 10, wherein the collision monitoring unit has a memory unit with data which are stored therein and which describe at least one limit curve, wherein during the comfort position transition the seat components are actuated by the actuators in such a way that the seat components cannot be moved out of the limit curve.

12. The seat device as claimed in claim 1, wherein the range of individual adaptations of positions for the seat components by an end user is between the at least two definitely predetermined comfort positions.

13. A method for operating seat components of a seat device having a processing unit and a memory unit, the method comprising:
   the memory unit storing at least one data record concerning a comfort position transition for achieving a comfort position transition between at least two comfort positions and at least another data record defining a range of individual adaptations of positions for the seat components by an end user, and
   the processing unit operating the actuators and adjusting positions of the seat components according to the data record concerning the comfort position transition in at least one operating mode in order to achieve the comfort position transition and within the range of individual adaptations of positions for the seat components.

14. The method for operating seat components of a seat device as claimed in claim 13, wherein the range of individual adaptations of positions for the seat components by an end user is between the at least two comfort positions.

15. An aircraft seat device, comprising:
   seat components that are adjustable,
   actuators for individually adjusting positions of the seat components, a memory unit storing at least one data record concerning a comfort position transition for achieving a comfort position transition between at least two definitely predetermined comfort positions by adjustment of the seat components, the memory unit also storing at least another data record which defines a range of individual adaptations of positions for the seat components by an end user, and a processing unit operating at least one of the actuators according to the at least one data record concerning the comfort position transition in order to achieve the comfort position transition and according to at least one individual adaptation of the seat components within the range of individual adaptations of positions for the seat components stored in memory.

16. The aircraft seat device as claimed in claim 15, wherein the range of individual adaptations of positions for the seat components by an end user is between the at least two definitely predetermined comfort positions.

\* \* \* \* \*